(12) United States Patent
Kim (10) Patent No.: US 6,480,622 B1
(45) Date of Patent: Nov. 12, 2002

(54) IMAGE PROCESSING METHOD FOR ELIMINATING COLOR SHIFTS GENERATED IN CONTOUR REGION IN IMAGE OBTAINED FROM IMAGE INPUT APPARATUS

(75) Inventor: Talguk Kim, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/316,772

(22) Filed: May 21, 1999

(30) Foreign Application Priority Data

May 27, 1998 (JP) ............................................ 10-146131

(51) Int. Cl.[7] .......................... G06K 9/00; G03F 3/08; H04N 1/387
(52) U.S. Cl. ........................ 382/162; 382/163; 382/167; 358/518; 358/523; 358/452
(58) Field of Search ................................. 382/162, 163, 382/164, 165, 167; 358/515, 518, 520, 523, 443, 452, 453, 538

(56) References Cited

U.S. PATENT DOCUMENTS

| | | | | |
|---|---|---|---|---|
| 5,426,289 A | * | 6/1995 | Kinoshita et al. | ............ 235/469 |
| 5,506,603 A | * | 4/1996 | Kawaano et al. | ............ 345/154 |
| 5,517,334 A | * | 5/1996 | Morag et al. | ................ 358/518 |
| 5,629,990 A | * | 5/1997 | Tsuji et al. | .................. 382/324 |
| 6,023,527 A | * | 2/2000 | Narahara | ..................... 382/167 |

FOREIGN PATENT DOCUMENTS

JP          2756048          5/1998

* cited by examiner

Primary Examiner—Phuoc Tran
Assistant Examiner—Amir Alavi
(74) Attorney, Agent, or Firm—Brinks Hofer Gilson & Lione (57) ABSTRACT

An image processing method includes the steps of converting an image obtained from an image input apparatus into an L·a·b image (where L represents the gray scale axis, or luminance, and a and b represent two orthogonal axes that together define the color and saturation), obtaining a chroma image by using chroma processing to process a and b values which are chrominance-signal values in the pixels of the a and b images as saturation images, obtaining a binary image by binarizing the pixels of the chroma image, extracting the contour of the binary image, and extracting a region in which achromatization is performed by widening the extracted contour of the extracted image.

5 Claims, 7 Drawing Sheets

CONTOUR IMAGE I (x, y)

IMAGE O (x, y)

FIG. 11

CONTOUR O (x, y) IN WHICH
CONTOUR-LINE WIDTH IS
INCREASED BY 1-PIXEL WIDTH

FIG. 12

IMAGE PROCESSING METHOD FOR ELIMINATING COLOR SHIFTS GENERATED IN CONTOUR REGION IN IMAGE OBTAINED FROM IMAGE INPUT APPARATUS

BACKGROUND OF THE INVENTION

1. Field of the Invention

The present invention relates to image processing methods, and in particular, to an image processing method for eliminating color shifts generated in a contour region in an image obtained from an image input apparatus.

2. Description of the Related Art

In conventional image processing, an image recorded using an image input apparatus such as a digital camera or a scanner is input to a computer or the like, and the image is output from a printer.

This type of image processing has a problem in that color shifts may be generated in a contour region in the image recorded by the image input apparatus. The color shifts are generated such that a color having chroma forms a point or line in the contour portion of an almost achromatic region. This is caused by characteristics of the image input apparatus, that is, lens characteristics such as chromatic aberration, an arrangement of red, green, and blue (RGB) filters in a single charge-coupled device, or an image compression technique, etc.

The generation of the color shifts in the contour region of the image makes it impossible to output a clear recording image, which causes a substantial deterioration in the image quality.

SUMMARY OF THE INVENTION

Accordingly, it is an object of the present invention to provide an image processing method that securely eliminates color shifts generated in a contour region of an image, whereby outputting a clear image and greatly enhancing the image quality.

To this end, according to an aspect of the present invention, the foregoing object is achieved through provision of an image processing method including the steps of converting an image obtained from an image input apparatus into an L·a·b image (where L represents the gray scale axis, or luminance, and a and b represent two orthogonal axes that together define the color and saturation), obtaining a chroma image by using chroma processing to process a and b values which are chrominance-signal values in the pixels of the a and b images as saturation images, obtaining a binary image by binarizing the pixels of the chroma image, extracting the contour of the binary image, and extracting a region in which achromatization is performed by widening the extracted contour of the extracted image.

Preferably, the extracted contour of the image is widen in an arbitrary direction.

According to another aspect of the present invention, the foregoing object of the present invention is achieved through provision of an image processing method that uses RGB-image data includes the steps of converting an RGB image obtained from an image input apparatus into an L·a·b image, obtaining a chroma image by using chroma processing to process a and b values which are chrominance-signal values in the pixels of the a and b images as saturation images, obtaining a binary image by binarizing the pixels of the chroma image, extracting the contour of the binary image, extracting a region in which achromatization is performed by widening the extracted contour of the image, achromatizing the a and b images, and converting the L·a·b image processed by achromatization into an RGB image.

According to the present invention, by extracting a region in which achromatization is performed, color shifts generated in the contour region of an image can be securely extracted as the region in which achromatization is performed, and a clear image in which the color shifts are securely eliminated can be output. Therefore, the image quality can be greatly enhanced.

DESCRIPTION OF THE PREFERRED EMBODIMENT

Figure 1:
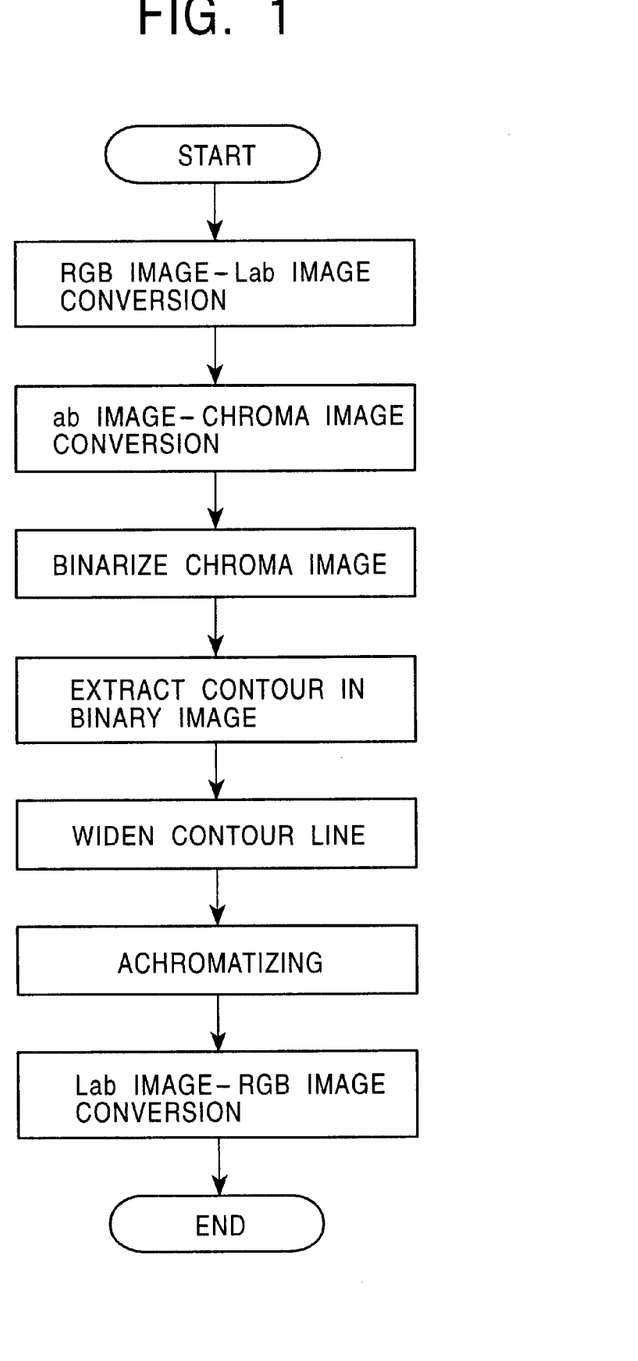
FIG. 1 is a flowchart showing an image processing method according to an embodiment of the present invention.

FIG. 1 shows an image processing method according to an embodiment of the present invention.

An image captured by an image input apparatus such as a digital camera or a scanner is input as an RGB image.

The pixels of the RGB image are converted to generate an L·a·b image. The Lab image is generated by replacing the pixels of the RGB image (where RGB levels are defined by the NTSC) by X and Y coordinates of the L·a·b model defined in the CIE (Commission Internationale de l' Éclairage) chromaticity diagram.

Values a(x,y), and b(x,y), which are chrominance-signal values in each pixel of an a·b image obtained by separating the L·a·b image, are converted into chroma (saturation value) C(x,y) by chroma processing using the following equation:

$$C(x,y)=\sqrt{(a(x,y))^2+(b(x,y))^2}$$

Subsequently, each pixel C(x,y) of the chroma image is binarized. When each pixel C(x,y) of the chroma image is greater than a predetermined threshold value, its color is regarded as chromatic, and pixel value I(x,y)=1 is provided to binary image I, while when each pixel C(x,y) of the chroma image is less than the predetermined threshold value, its color is regarded as achromatic, and pixel value I(x,y)=0 is provided to binary image I. Accordingly, binary image I(x,y) in which pixels are classified from the chroma image into chromatic and achromatic colors is obtained.

Figure 2:
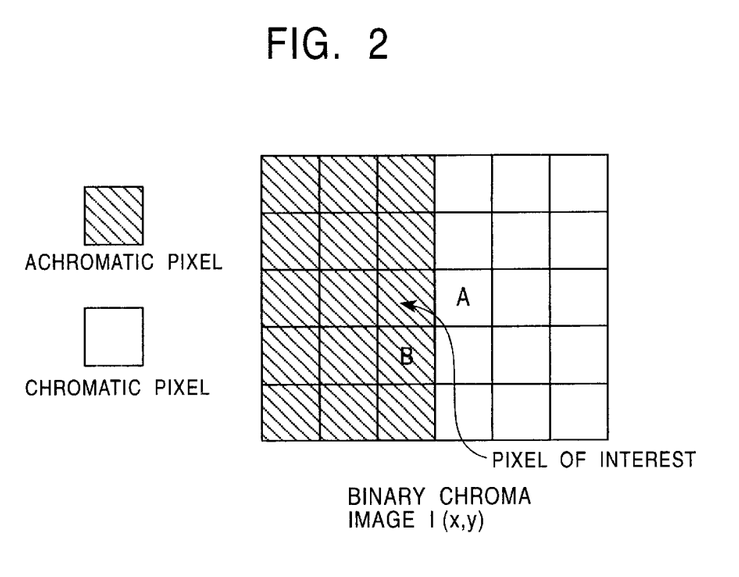
FIG. 2 is a drawing illustrating the basic condition of the extraction of a binary-image contour from a chroma image in accordance with an image processing method of the present invention.

The contour of the obtained binary image I(x,y) is extracted. As shown in FIG. 2, contour extraction is performed by referring to pixel I(x+1,y) (indicated by reference symbol A) that is adjacently positioned on the right of pixel I(x,y) of interest as each pixel of binary image I and to pixel I(x,y+1) (indicated by reference symbol B) that is adjacently positioned under pixel I(x,y) of interest, and marking pixel I(x,y) of interest as a contour pixel when the value added to pixel I(x,y) of interest differs from the value provided to each reference value.

The extraction of the contour of binary image I(x,y) is further described with reference to FIGS. 2 to 6.

Figure 3:
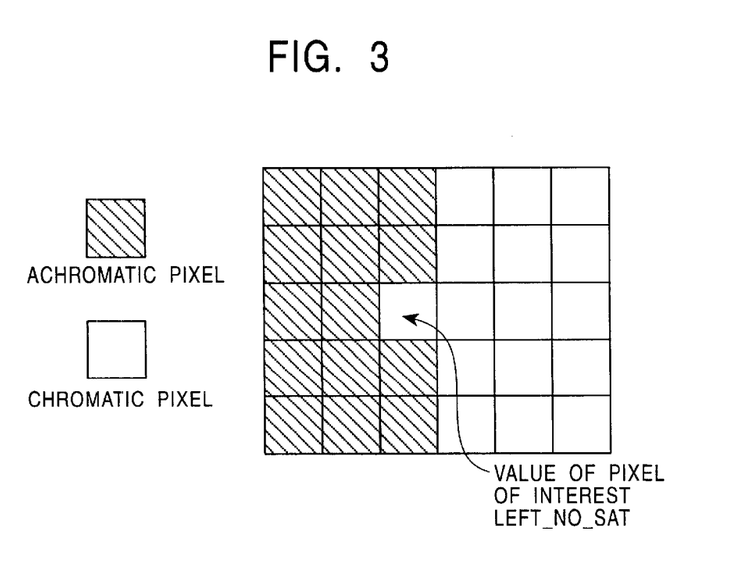
FIG. 3 is a drawing illustrating the marking of a pixel of interest in the extraction of a binary-image contour from a chroma image in accordance with an image processing method of the present invention.

When achromatic pixels provided with the value "0" of a pixel of interest are indicated by shading as shown in FIG. 3, the pixel under the pixel of interest is an achromatic pixel provided with pixel value "0", and is identical to the pixel of interest. However, a pixel adjacently positioned on the right of the pixel of interest is a chromatic pixel provided with pixel value "1", and differs from the pixel of interest. Accordingly, the pixel of interest is labeled "LEFT_NO_SAT". In this embodiment, in the case where the pixel of interest is an achromatic pixel provided with pixel value "0", and differs from a pixel adjacently positioned on the right, it is labeled "LEFT NO SAT". In the case where the pixel of interest is a chromatic pixel provided with pixel value "1", and differs from the pixel adjacently positioned on the right, it is labeled "LEFT SAT". In the case where the pixel of interest is an achromatic pixel provided with pixel value "0", and differs from the pixel under it, it is labeled "UP_NO_SAT". In the case where the pixel of interest is a chromatic pixel provided with pixel value "1", and differs from a pixel under it, it is labeled "UP_STAT".

Figure 4:
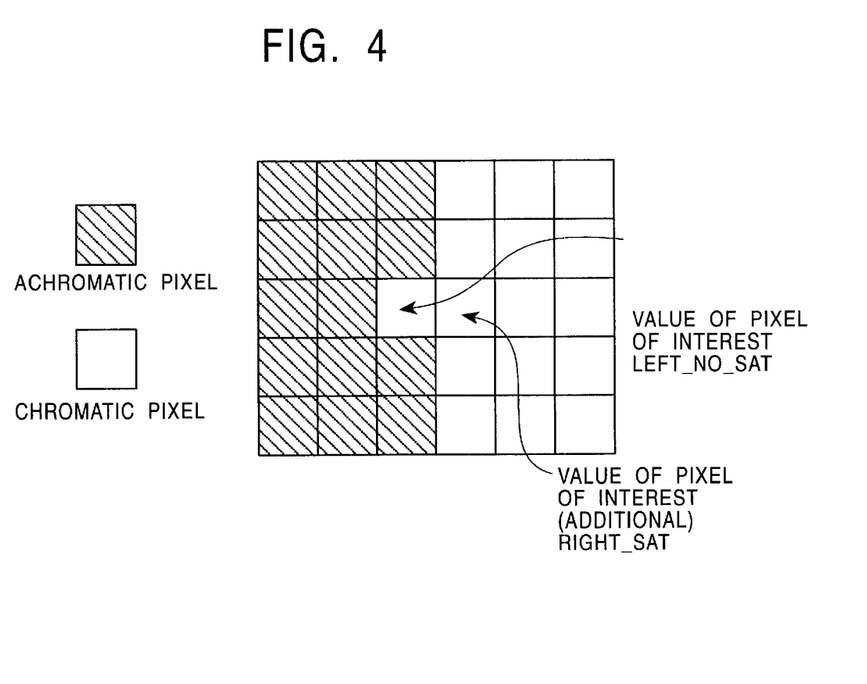
FIG. 4 is a drawing illustrating the marking of a pixel of interest which is adjacent to a pixel of interest in the extraction of a binary-image contour from a chroma image in accordance with an image processing method of the present invention.
Figure 5:
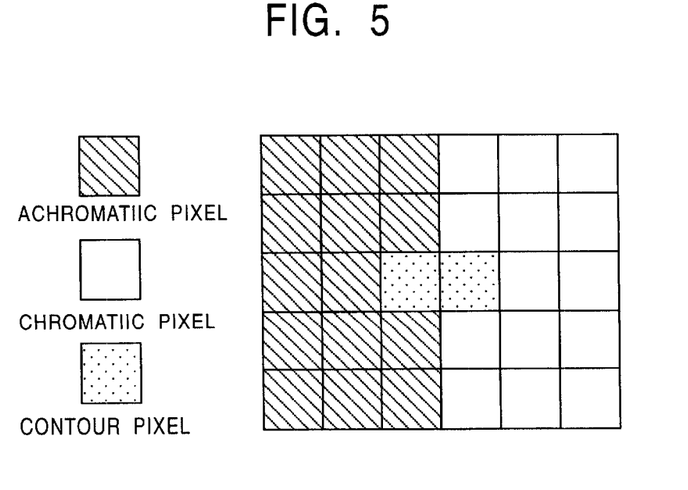
FIG. 5 is a drawing illustrating the extraction of a contour pixel in the extraction of a binary-image contour from a chroma image in accordance with an image processing method of the present invention.
Figure 6:
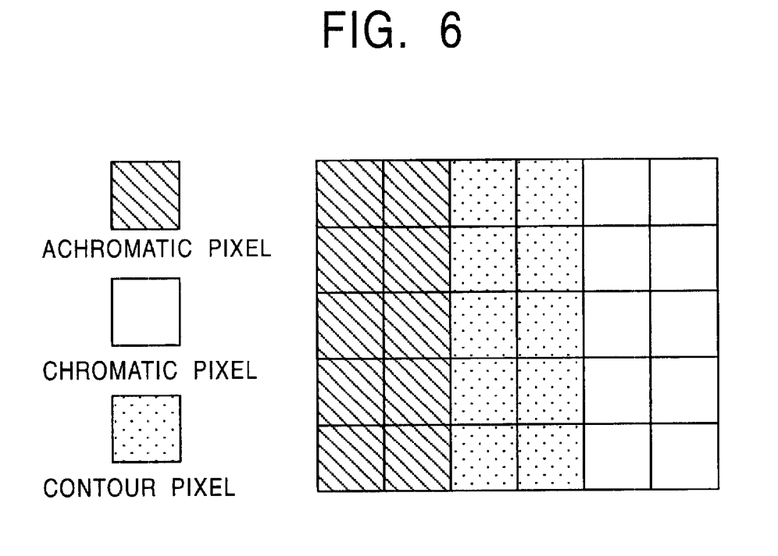
FIG. 6 is a drawing illustrating termination of the extraction of a binary-image contour from a chroma image in accordance with an image processing method of the present invention.

In the case where the label of the pixel of interest is any one of "LEFT_NO_SAT", "LEFT_SAT", "UP_NO_SAT", and "UP_STAT" after the above-described processing has been performed for all the pixels, an adjacently positioned pixel is labeled as shown in FIG. 4. In other words, when the label of adjacent pixel I(x,y) is "LEFT_NO_SAT", adjacent pixel I(x+1,y) is labeled "RIGHT_SAT". When the label of pixel I(x,y) of interest is "LEFT_SAT", adjacent pixel I(x+1,y) is labeled "RIGHT_NO_SAT". When the label of pixel I(x,y) of interest is "UP_NO_SAT", adjacent pixel I(x,y+1) is labeled "DOWN_SAT". When the label of pixel I(x,y) of interest is "UP_SAT", adjacent pixel I(x,y+1) is labeled "DOWN_NO_SAT". All the pixels are scanned again, and when the label of the pixel of interest is any one of "LEFT_SAT", "LEFT_NO_SAT", "RIGHT_SAT", "RIGHT_NO_SAT", "UP_SAT", "UP_NO_SAT", "DOWN_SAT", and "DOWN_NO_SAT", the pixel of interest is provided with "2" as the value of a contour pixel as shown in FIG. 5. By using this processing, the pixels of the binary image are classified into pixels having achromatic pixel value "0", pixels having chromatic pixel value "1", and contour pixel value "2", as shown in FIG. 6.

Figure 7:
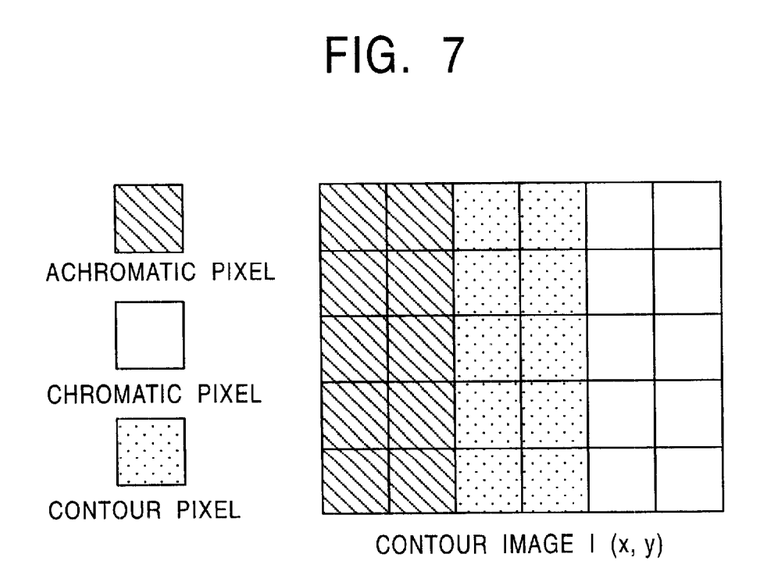
FIG. 7 is a drawing illustrating the basic condition of the widening of a contour in accordance with an image processing method of the present invention.
Figure 8:
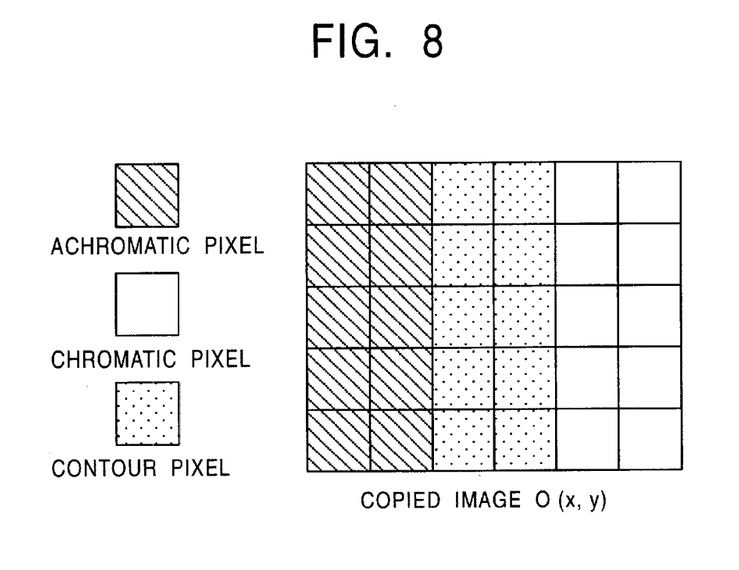
FIG. 8 is a drawing illustrating the condition of the widening of a contour after image copying is performed.
Figure 9:
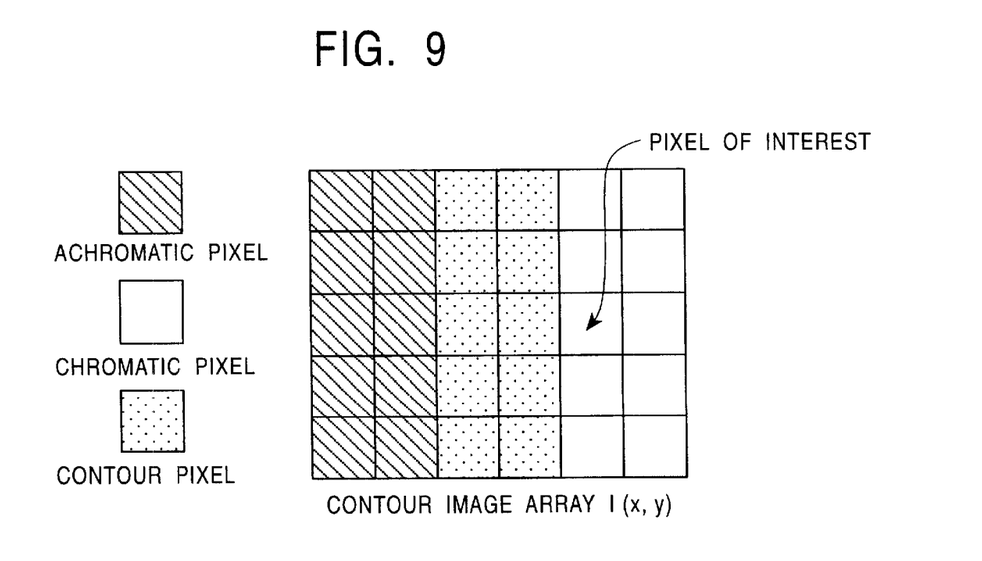
FIG. 9 is a drawing illustrating how a pixel of interest refers to adjacent pixels in the widening of a contour in accordance with an image processing method of the present invention.
Figure 10:
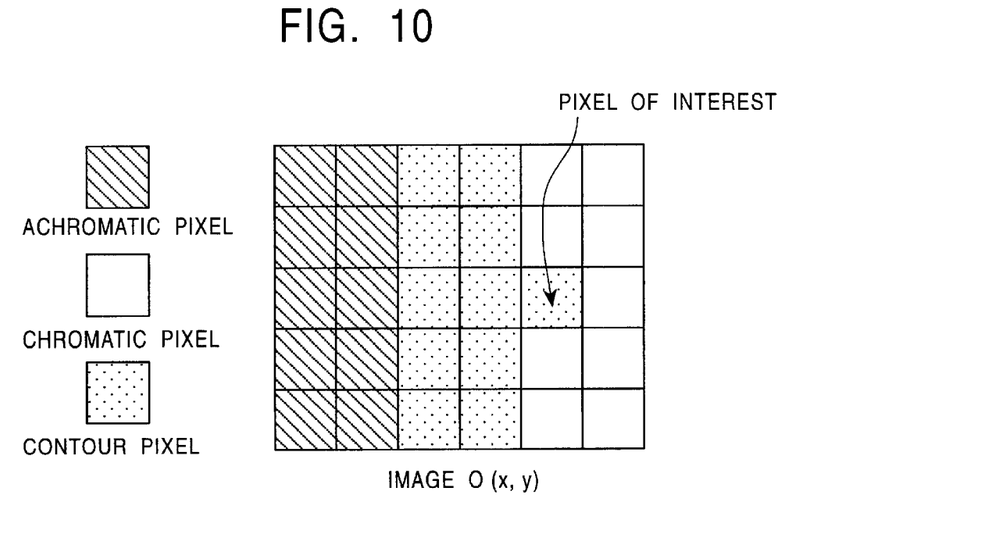
FIG. 10 is a drawing illustrating the marking of a pixel of interest in the widening of a contour in accordance with an image processing method of the present invention.
Figure 11:
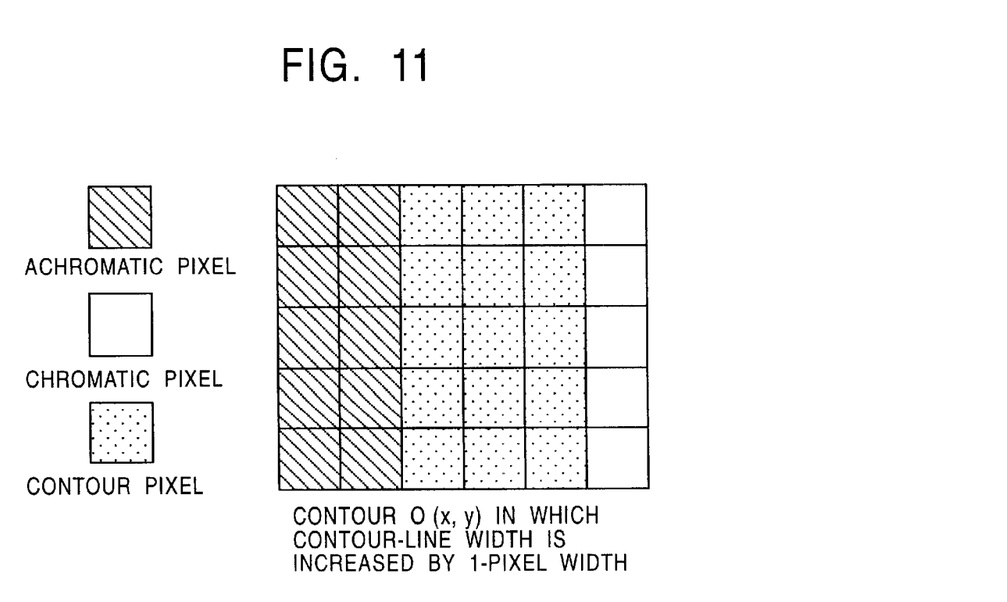
FIG. 11 is a drawing illustrating termination of the widening of a contour in accordance with an image processing method of the present invention.

Next, processing for widening an image contour line is performed. First, image I(x,y) shown in FIG. 7 is copied and pasted on a predetermined work region so that image O(x,y) is created as shown in FIG. 8. Image O(x,y) is scanned in order that a chromatic pixel, that is, a pixel having achromatic pixel value "1", may be retrieved. When a chromatic pixel is found, the chromatic pixel is used as a pixel of interest, and in the binary image, adjacent pixels I(x,y−1), I(x−1,y), I(x+1,y), and I(x,y+1) that are respectively positioned over and under, and on the right and left of the pixel of interest are referred to as shown in FIG. 9. In the case where any one of the adjacent pixels has contour pixel value "2", the pixel of interest of image O(x,y) is provided with pixel value "2" as shown in FIG. 10. By using the width-increasing processing for all the chromatic pixels, image O(x,y) in which an image-contour-line width is increased by 1-pixel width can be obtained as shown in FIG. 11.

At this time, when the width of the contour line is further increased, the image O(x,y) in which an image-contour-line width is increased by 1-pixel width is used as image I(x,y), and the width-increasing processing is repeatedly performed. By setting an arbitrary number of times of the width-increasing processing, the width of the contour line can be arbitrarily increased. In addition, by setting an arbitrary pixel of interest and arbitrary reference pixels with respect to the pixel of interest, the width of the contour line can be increased in an arbitrary direction.

The above-described processes extracts a region in which achromatizing is performed.

Figure 12:
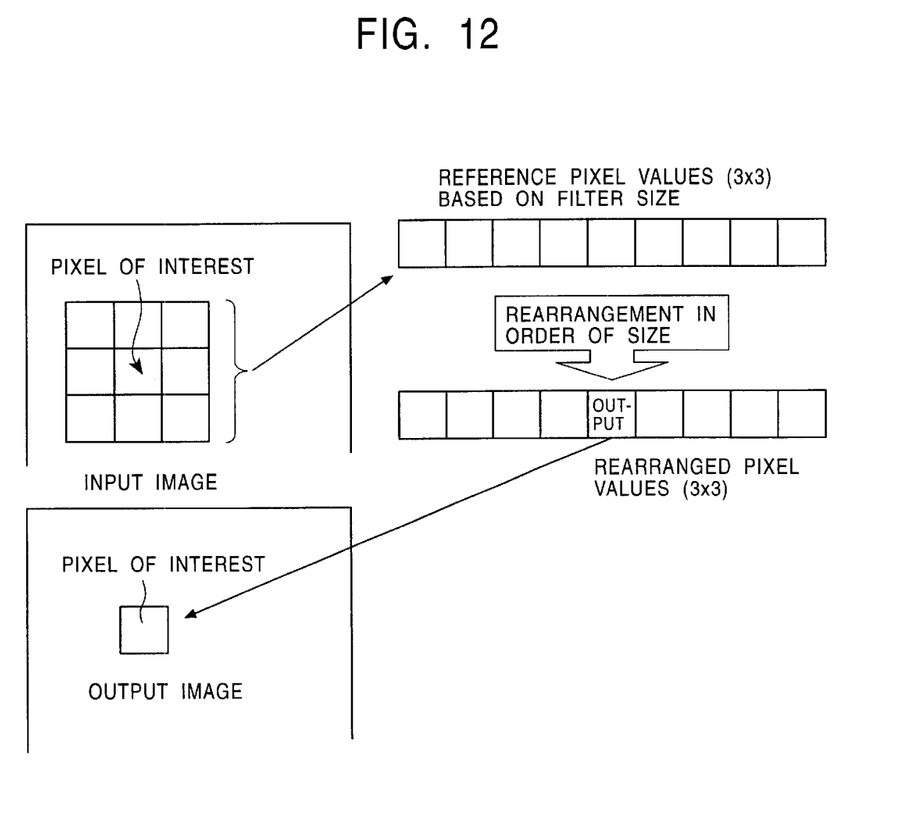
FIG. 12 is a drawing showing achromatization using a median filter in accordance with an image processing method of the present invention.

When the width-increasing processing is completed, a median filter is used to achromatize the a and b images. In achromatization, as shown in FIG. 12, when arbitrary filter size n is given, a rectangular pixel region composed of $(2n+1)^2$ pixels around the pixel of interest is used as a reference pixel region in which the median filter refers to the pixels, and all values included in the reference region are sequentially rearranged in order of size to form a rearrangement. The center value of the rearrangement is used as the output value of the median filter for the pixel of interest. In FIG. 12, the case where the filter size n=1 is shown. The filter processing is performed for each of the a and b images.

When the above-described processes terminates, the L·a·b image is converted into an RGB image, and a predetermined type of outputting is performed based on the data of the RGB image.

Accordingly, in this embodiment, an L·a·b image obtained by converting an image from an image input apparatus is processed by chroma processing, and the pixels of the chroma image are binarized so that the image contour is extracted. By increasing the width of the image contour, a region for achromatization is extracted. Thus, color shifts generated in the contour region of the image can be securely extracted as the region for achromatization, whereby the color shifts can be securely eliminated to enable the outputting of a clear image, and the image quality can be greatly enhanced.

What is claimed is:

1. An image processing method for eliminating color shifts generated in a contour region in an image obtained from an image input apparatus, said image processing method comprising the steps of:
converting the RGB image obtained from said image input apparatus into an L·a·b image where L represents the gray scale axis, namely, luminance, and a and b represent two orthogonal axes that together define the color and saturation;

using chroma conversion processing for converting the a and b values which are chrominance-signal values in the pixels of the a and b images obtained by decomposing the L·a·b image into the chroma image;

obtaining a binary image by binarizing the pixels of the chroma image;

extracting a contour of the binary image;

widening the extracted contour;

performing achromatization in the widened contour; and after performing said achromatization, converting the L·a·b image into an RGB output image.

2. An image processing method according to claim 1, wherein a predetermined output is carried out on the basis of said converted RGB image data.

3. An image processing method according to claim 1, wherein the step of extracting a contour of said binary image comprises the steps of;
selecting a pixel of said binary image as a pixel of interest;
referring a value of said pixel of interest and a value of adjacent positioned pixel of said pixel of interest,
when the value of said pixel of interest is different from the value of said adjacent positioned pixel, said pixel of interest is marked as a contour pixel.

4. An image processing method according to claim 1, wherein the step of extracting a region in which achromatization is performed by widening said extracted contour comprises the steps of;
scanning a binary image in order to find a chromatic pixel as a pixel of interest,
referring a value of said pixel of interest and a value of adjacent positioned pixel of said pixel of interest,
when any one of said adjacent positioned pixels has a value as a contour pixel, said pixel of interest is marked as a contour pixel.

5. An image processing method according to claim 1, wherein the step of performing achromatization in the extracted contour is processed for the a image and b image with a media filter.

* * * * *